(12) United States Patent
Agrahari et al.

(10) Patent No.: US 11,227,111 B2
(45) Date of Patent: Jan. 18, 2022

(54) GRAPHICAL USER INTERFACE PROVIDING PRIORITY-BASED MARKUP OF DOCUMENTS

(71) Applicant: SAP SE, Walldorf (DE)

(72) Inventors: Saket Agrahari, West Bengal (IN);
Shivaprasad K C, Bangalore (IN);
Shruthi Jinadatta, Karnataka (IN);
Madhava Dama, Bangalore (IN);
Debashis Banerjee, Bengaluru (IN)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 16/400,898

(22) Filed: May 1, 2019

(65) Prior Publication Data
US 2020/0349225 A1    Nov. 5, 2020

(51) Int. Cl.
*G06F 40/242*  (2020.01)
*G06K 9/00*    (2006.01)
*G06F 16/21*   (2019.01)
*G06F 40/284*  (2020.01)

(52) U.S. Cl.
CPC .......... *G06F 40/242* (2020.01); *G06F 16/219* (2019.01); *G06F 40/284* (2020.01); *G06K 9/00469* (2013.01); *G06K 2209/01* (2013.01)

(58) Field of Classification Search
CPC .... G06F 40/242; G06F 16/219; G06F 40/284; G06K 9/00469; G06K 2209/01

USPC ....................................................... 715/229
See application file for complete search history.

(56) References Cited

U.S. PATENT DOCUMENTS

| | | | |
|---|---|---|---|
| 9,275,368 B1 * | 3/2016 | Harpalani | G06Q 10/10 |
| 10,467,344 B1 * | 11/2019 | Jade | G06F 40/205 |
| 2004/0019578 A1 * | 1/2004 | Kalmes | G06F 16/90344 |
| 2014/0053069 A1 * | 2/2014 | Yan | G06Q 10/0635 |
| | | | 715/259 |
| 2014/0245123 A1 * | 8/2014 | Pircher | G06F 40/169 |
| | | | 715/232 |
| 2014/0281880 A1 * | 9/2014 | Sachs | G06F 40/117 |
| | | | 715/234 |

* cited by examiner

*Primary Examiner* — Hope C Sheffield
(74) *Attorney, Agent, or Firm* — Klarquist Sparkman, LLP (57) ABSTRACT

A first version of a document is accessed so that a corresponding contract dictionary is generated with a plurality of string tokens. Subsequently, a visual distinction is assigned to the corresponding ranking priority of each of the plurality of string tokens. A second version of the document is accessed and changed string tokens are identified by comparing the second version with the first version of the document. A corresponding ranking priority is then retrieved for each of the changed string tokens in the contract dictionary so that each of the changed string tokens can be highlighted with the visual distinction corresponding to the ranking priority. Each of the highlighted changed string tokens can then be displayed with the visual distinction and the document on a graphical user interface.

19 Claims, 8 Drawing Sheets

| String Label | Priority value | Color Code | Related To |
|---|---|---|---|
| Price | Priority 1 | Red | Item, Date |
| Payment terms | Priority 2 | Orange | Item, Date |
| Date | Priority 2 | Orange | Document |
| Gold | Priority 4 | Green | Item, Commodity, Quantity, Price |
| Organization | Priority 3 | Yellow | Document |

1000

Example 1:
Gold(Commodity) $300/gm (Price) APAC (Region) 50 Unit.(Quantity) $15000 USD (Price)

The Filtered difference view editor will be used for reviewing the document with priority based markup on the text documents.

| TA SAP Ariba | AW Options... | Page Generation: 156056 | FULL PAGE REFRESH! ☒ Global escps content changed – VR Script? | Resume Customization ⬌ ⬚ Help • Customer Support Admin |

Review Changes

Review Changes done to the document.

No. ~~CW2025~~ CW2026

This (Agreement) is entered into by and between ROCKWELL COLLIN ~~POWER~~ INC., with principal offices in, Cedar Rapids, Iowa (Rockwell Collins ~~Power~~ Inc.) ~~or~~ and, with Principal offices in, (Seller). Each may be referred to individually as Party or collectively as Parties.

In consideration of the promises, terms and conditions in this Agreement, the Parties agree as follows:

TERMS

The term of this Agreement shall commence on ~~01/1/2017~~ 2018 and expire on ~~8/1/~~30/2018. Any extension to the term of this Agreement shall be via amendment to this Agreement added.

DEFINITIONS

Agreement

This No. ~~CW2025~~ CW2026.

Aircraft

Airplane or airplanes either fixed wing or rotary wing.

Buyer

~~Gold $300~~ Copper $160/gm USD ~~APAC~~ EMEA region ~~50~~ 100 unit ~~$11000 USD~~ $16000 EUR Silver $200/gm USD EMEA region 100 unit $ 20000 USD Aluminum $100/gm USD CEMA region 2000 unit $200000 USD The legal entity Collin Power Inc., including all its divisions, Subsidiaries, or affiliates, at any location, within the United States or in a foreign country or territory when those entities may be involved in issuing Orders.

An individual piece-part that is manufactured by Seller or procured from Seller's sub-tier suppliers and is and Item itself or is used to assemble, test and deliver items.

Buyer's authorization that modifies the terms or conditions of an Order. A Change Order may be released in the from of a revised Schedule Agreement or revised Order.

The Parties are entering into this Agreement to standardize the terms and conditions for Buyer to procure goods and services from Seller and to avoid the necessity of negotiating those term and conditions each time a new Purchase Agreement is needed. The terms of this Agreement shall apply to any Purchase Agreement in which the Parties in such Purchase Agreement expressly make this election.

Priority: High ▬▬▬▶ Low
Color: ▨▨□▨■□  ▨■□

Changes 1 (22)   [Process Changes] [Reject changes] [Previous] [Next]

| | | |
|---|---|---|
| SAP Ariba | AW Options... | Page Generation / ACL / FULL PAGE REFRESH! / Queries: 7 / Global escps content changed — VR Script? / Resume Customization ✏ Help▼Customer Support Admin |

Document
⌨ X
Drag and drop file to replace

Status: Draft
Version: v3 (editing)
ID: Doc32323

G25M5 — 5000 — [Done]

Listed below are the details of this Document, including Tasks associated with it. You can Edit the overview, Copy or Move the document, and Publish it for use by other team members by clicking Actions. You can also initiate reviews, approvals or to do tasks by   More cw test 21709 / X

| Overview | Outline View | Version History |
|---|---|---|

Clause Type: All ▼   [Actions ▼]  [▦]  |  »

| Clause | Type | Comments | Action |
|---|---|---|---|
| ← Priority 6 | | | |
| ⌨ No :CW6414: | Ad Hoc | | Actions ▼ |
| ⌨ This (Agreement) is entered into by and between :COLLIN POWER INC:, with principal offices in, Cedar Rapids, Iowa (Buyer or Collin Power Inc.) with Principal offices in, (Seller). Each may be referred to individually as Party or collectively as Parties. ← Priority 3 | Nonstandard | | Actions ▼ |
| ▼ TERMS | | | |
| ← Priority 2 | | | |
| ⌨ The term of this Agreement shall commence on :8/1/2018: and expire on :8/31/2018: Any extension to the term of this Agreement shall be via amendment to this Agreement added. | Ad Hoc | | Actions ▼ |
| ▼ DEFINITIONS | | | |
| ▼ Agreement | | | |
| ⌨ This No :CW6415: ← Priority 1 | Ad Hoc | | Actions ▼ |
| ▼ Aircraft | | | |
| ⌨ Airplane or airplanes either fixed wing or rotary wing. | Ad Hoc | | Actions ▼ |
| ▼ Buyer   Priority 5 | | | |
| ⌨ :Silver: :$200/gm USD: :EMEA region: :100 unit: :$ 20000 USD: | Nonstandard | | Actions ▼ |
| ⌨ :Gold: :$300/gm USD: :APAC region: :100 unit: :$ 20000 USD: | Nonstandard | | Actions ▼ |
| ⌨ :Aluminum: :$100/gm USD: :CEMA region: :2000 unit: :$200000 USD: | Nonstandard | | Actions ▼ |
| ⌨ An individual piece-part that is manufactured by Seller or procured from Seller's sub-tier suppliers and is and Item itself or is used to assemble, test and deliver Items.  ← Priority 4 | Ad Hoc | | Actions ▼ |
| ⌨ Buyer's authorization that modifies the terms or conditions of an Order. A Change Order may be released in the from of a revised Schedule Agreement or revised Order. | Ad Hoc | | Actions ▼ |
| ⌨ The legal entity :Collin Power Inc: including all its divisions, Subsidiaries, or affiliates, at any location, within the United States or in | | | |

GRAPHICAL USER INTERFACE PROVIDING PRIORITY-BASED MARKUP OF DOCUMENTS

TECHNICAL FIELD

The subject matter described herein relates to advanced graphical user interfaces for visualizing markups amongst different versions of documents.

BACKGROUND

In a computer-implemented collaborative working environment, when multiple entities are working on a document, such as a contract document, the ability to track changes between a new version and an old version increases efficiency and saves time and labor. Sometimes, multiple parties need to review changes in more than two versions of the same document. In other cases, all historical versions of a document need to be reviewed. Among all the changes to the historical versions, some changes can be more important than the others, and the more important changes can deserve heightened attention from one or more reviewers. However, it is often difficult to readily identify and assess the relative importance of such changes.

SUMMARY

A computer-implemented collaborative working environment is provided in which historical changes of a document are highlighted with different visual distinctions on a graphical user interface according to their importance so that multiple users can track changes and make revisions according to their importance rankings. Users may also choose to review changes of only a particular importance level. Users may choose to ignore changes of certain importance levels, for example, the least important levels.

In another aspect, a first version of a document is accessed so that a contract dictionary can be built for the first version of the document with a plurality of string tokens contained in the first version of the document. For each string token in the document, if one of the plurality of string tokens contained in the first version of the document is a pre-determined string token, a ranking priority associated with the pre-determined string token can be assigned to the one of the plurality of string tokens. Otherwise, if one of the plurality of string tokens contained in the first version of the document is not a pre-determined string token, then an option can be provided via a graphical user interface to add the one of the plurality of string tokens to the contract dictionary and assigning a corresponding ranking priority to the one of the plurality of string tokens.

A visual distinction can be assigned to the corresponding ranking priority of each of the plurality of string tokens. Further, a second version of the document can be accessed so that changed string tokens can be identified by comparing the second version with the first version of the document. A corresponding ranking priority can then be retrieved for each of the changed string tokens in the contract dictionary. In addition, each of the changed string tokens can be highlighted with the visual distinction corresponding to the ranking priority, and each of the highlighted changed string tokens can be displayed with the visual distinction and the document on a graphical user interface.

In some variations, a subset of the changed string tokens can be highlighted in the graphical user interface with a visual distinction corresponding to a predetermined ranking priority. The highlighted subset of the changed string tokens can be displayed with a visual distinction corresponding to a predetermined ranking priority and the document on the graphical user interface.

The highlighted subset of the changed string tokens with the visual distinction corresponding to the predetermined ranking priority can be accepted in response to user-generated input received via the graphical user interface. Similarly, the graphical user interface can also be used to reject (in response to user-generated input) the highlighted subset of the changed string tokens with the visual distinction corresponding to the predetermined ranking priority.

A subset of the changed string tokens can be highlighted in the graphical user interface with the visual distinction corresponding to the predetermined ranking priority. The highlighted subset of the changed string tokens with the visual distinction corresponding to the predetermined ranking priority can be accepted in response, for example, to user-generated input via the graphical user interface.

The highlighted subset of the changed string tokens with the visual distinction corresponding to the predetermined ranking priority can be rejected in response, for example, to user-generated input via the graphical user interface.

In some variations, a first version of a document can be accessed after feeding a hard copy of the first version of the document to an Optical Character Recognition (OCR) unit. Similarly, a second version of the document can be generated after applying a hard copy to the OCR unit. The first and/or second versions of the document can be obtained locally (e.g. via local storage) or remotely from one or more networks.

If one of the plurality of string tokens contained in the first version of the document is not a pre-determined string token, and if the one of the plurality of string tokens contained in the first version of the document is a linking or auxiliary verb, a low ranking priority can be assigned to the one of the plurality of string tokens. Graphical user interface elements can be provided in the graphical user interface to accept or reject the highlighted subset of the changed string tokens. Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter is advantageous in that it provides advanced graphical user interfaces providing priority based color-coded document comparison, which, in turn, saves time for the reviewer in reviewing documents and enables quick sign off of the document. The current subject matter is also advantageous in that increases productivity because the reviewer can ignore revisions with low priority. The enhanced view provides quantitative review of the document for easy identification of critical changes, as a result, the method increase the confidence of the reviewer with clear markups. In a collaborative computer-implemented working environment, the current subject matter also facilitates the reviewers to identify important sections with higher priority to better collaborate.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a diagram illustrating an entry point for a new review process.

FIG. 3 is a diagram illustrating an example of a priority based color-coded document comparison.

FIG. 4 is a diagram illustrating another example of a priority based color-coded document comparison.

FIG. 5 is a diagram illustrating yet another example of a priority based color-coded document comparison.

Like reference, symbols in the various drawings indicate like elements.

DETAILED DESCRIPTION

In a collaborative, computer-implemented working environment, when multiple entities are working on a document, such as a contract document, the ability to track changes between a new version and an old version can increase efficiency and saves time and labor. Among all the changes to the old version, some changes can be more important than the others and the more important changes can deserve heightened attentions. For example, in a contract document, the price information can be considered critical and as a result, any changes in price in the new version of the contract document can deserve to be reviewed with high priority. The reviewer can decide whether to accept or reject the changes in price in the new version before any other changes of lower priorities can be reviewed and decided.

A priority based color-coded document review tool can build a dictionary for the string tokens contained in the document, and each of the string tokens can be assigned a ranking priority value. For example, priority values from 6 to 1 can indicate priorities from high to low. A high-ranking priority value associated with a string token can indicate that the specific string token carries a more important meaning in the context of a document. For example, in a contract document, string tokens such as price and payment terms can typically carry higher priorities because such strings and their associated numbers can be important in the context of a contract. In building a contract dictionary, a contract dictionary engine can lexically analyzes the document and the string tokens contained therein. The contract dictionary engine can assign ranking priorities to each string token according to certain pre-determined scheme, or provide the reviewer opportunities to define a different ranking priority scheme according to a pre-determined requirement. Each ranking priority can be assigned a unique visual distinction, for example a unique color.

Once the contract dictionary is built for a document, subsequent versions of the same document can be compared to the earlier version to highlight changes in the newer version. The changed string tokens can be fed into the contract dictionary to retrieve their corresponding ranking priorities to further highlight the priority of each changed string token with its corresponding visual distinction. For example, changes to string tokens with the highest priority can be colored red for heightened attention. The reviewer can select to only highlight changes to certain priorities to edit. For example, the reviewer can choose to only display changes of the highest priority, or red changes, to edit, accept or reject. The reviewer can also choose to only display and edit the lowest priority changes and accept or reject the lowest priority changes without wasting much time reviewing them because such changes may be trivial.

A method for priority based color-coded document comparison as described herein can compare a new and an old version of a document and highlights changes. Each of the changed string tokens can bear a corresponding ranking priority which is highlighted with a visual distinction, for example, a color code. With the current subject matter, a contract dictionary can be built from the string tokens in the old version of the document, and each string token in the contract dictionary can have a corresponding ranking priority with a unique visual distinction such as different colors.

Figure 1:
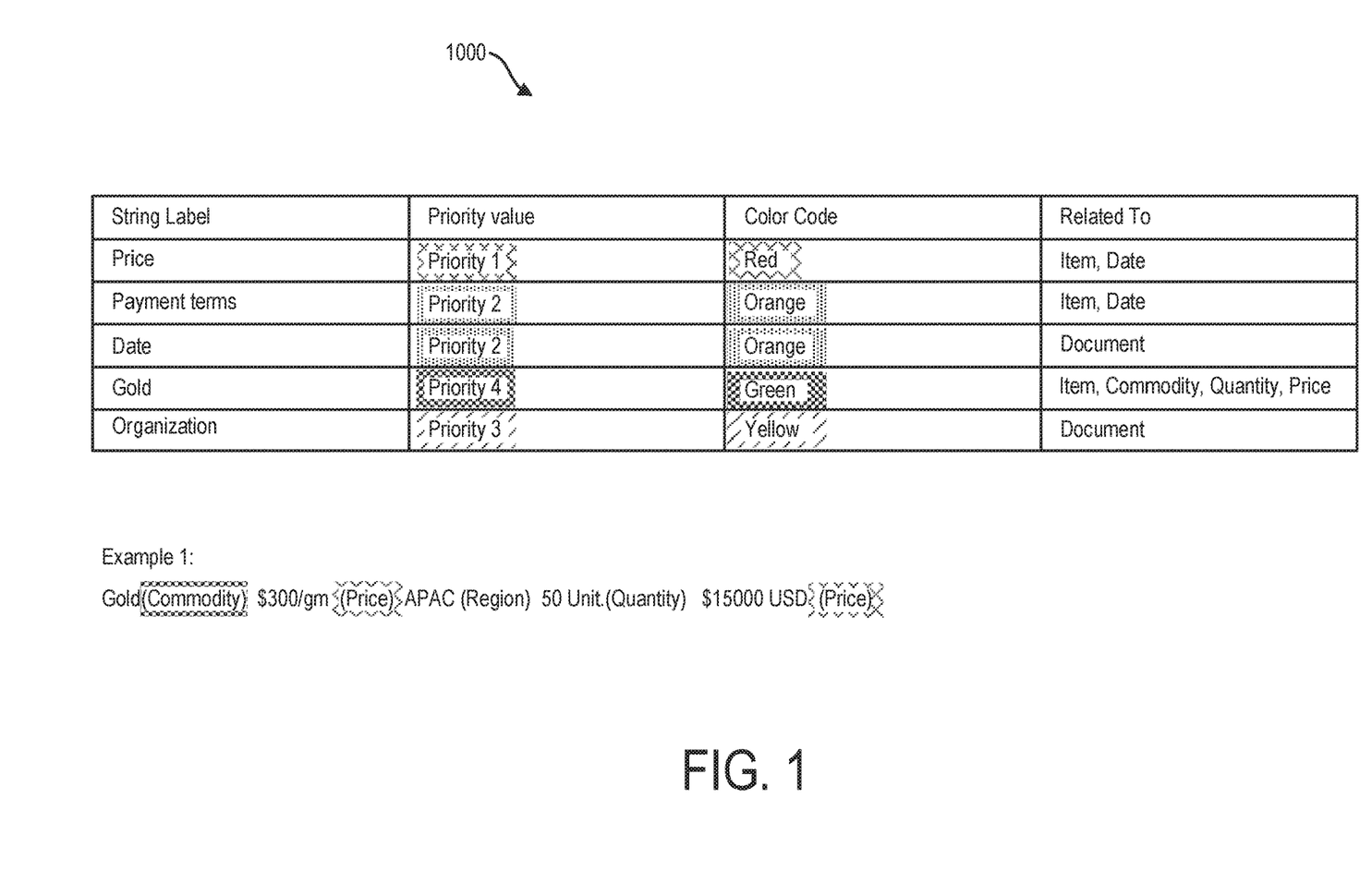
FIG. 1 is a diagram illustrating visual distinctions and priority values associated with string tokens.

FIG. 1 is an illustration of visual distinctions and priority values associated with some string tokens. A contract dictionary of a document can be a list of string tokens contained in the document. Each string token in the contract dictionary can have a ranking priority value. Each ranking priority value can correspond to a visual distinction such as color. In the table 1000 illustrated in FIG. 1, there can be five string tokens in the contract dictionary: "price", "payment terms", "date", "gold" and "organization". The string "price" can have the highest priority value: priority 1, and can thus be assigned the red color, for example, because "price" can often times be the most important term in any commercial contract. A change regarding price in a contract can be a critical change which deserves attention. The strings "payment terms" and "date" can be assigned the next level of priority: priority 2, with color orange, for example. Any changes regarding payment terms and date in a contract can also be important and deserves heightened attention, but maybe not as important as price. Other strings can be of lower priorities, for example, the string "gold" can be assigned priority 4 with green color, and the string "organization" can be assigned priority 3 with yellow color. While certain strings can be of higher priority in contract documents, the priority ranking of one or more strings in a given contract document can be re-defined and can be changed by a user according to specific contexts and requirements.

The contract dictionary can also contain information regarding the relationship between the strings, accordingly in the table in FIG. 1, a "related to" field can be maintained to characterize the relationship between a given string with other strings in the same dictionary. For example, the strings "price" and "payment terms" can be related to strings "item" and "date", the string "date" can be related to string "document", the string "gold" can be related to strings "item", "commodity", "quantity" and "price", and the string "organization" can be related to the string "document". The software and/or the hardware that builds and maintains the contract dictionary can be referred to as the contract dictionary engine. By maintaining the priority values of the string and the relationships between the strings in the contract dictionary, the contract dictionary engine can be capable of lexically analyzing a document based on the context. For example, priority 1 can indicate critical changes with red color; priority 2 can indicate high priority changes with orange color; priority 3 can indicate medium priority changes with yellow color; priority 4 can indicate low priority changes with green color; priority 5 can indicate trivial changes with blue color; and priority 6 can indicate no risk with indigo color.

FIG. 2 is an illustration of an entry point for a new review process, in accordance with some embodiments. 2000 can be a graphical user interface for priority based color-coded document review tool. The "Review uploaded document" menu option can be the entry point for a new review process. The priority based color-coded document review tool can be embedded in the SAP ARIBA platform. The priority based color-coded document review tool can be implemented in other software applications. By clicking "Review uploaded document", a new document or a new version of a document, which has been uploaded, can be reviewed. The subsequent operations can include building a contract dictionary from the new document, or comparing the new version with the old version saved in the system.

FIG. 3 is an illustration of an example of a priority based color-coded document comparison. 3000 can be a graphical user interface for priority based color-coded document review tool when a new version of a document is compared with an old version. Changes in the document window 3200 can be indicated by strikethroughs on the old strings, the changed strings can also be color-coded. 3110 can be a priority color panel which includes color codes from highest priority to the lowest priority. The highest priority 3111 can be coded red and the lowest priority 3117 can be coded purple, other priorities 3112-3116 can lay between the highest and the lowest priorities with colors from orange, yellow, green to blue. For example, price strings "$300" and "$160" can be coded red with the highest priority ranking, the word "or/and" can be coded purple with the lowest ranking. In the present example, changes associated with all priorities and all colors can be displayed. Buttons or other graphical user interface elements 3120 and 3130 can provide a reviewer with options to accept or reject the changes.

FIG. 4 is an illustration of another example of a priority based color-coded document comparison. 4000 can be a view of a graphical user interface, as in FIG. 3, for priority based color-coded document review tool when a new version of a document is compared with an old version. The difference between 4000 and 3000 can be that, in 4000, only changes associated with three priorities (red, orange and green) can be displayed, while in 3000, all changes can be displayed on the graphical user interface. By displaying only a subset of changes associated with a particular priority or color, the reviewer can choose to accept or reject changes to only certain priority. For example, the review can choose to display only the highest priority changes, review them and accept or reject the most important changes first without unnecessarily spending time on less important changes.

FIG. 5 is an illustration of yet another example of a priority based color-coded document comparison. 5000 can be a view of a graphical user interface, as in FIGS. 3 and 4, for priority based color-coded document review tool when a new version of a document is compared with an old version. 5000 can be an outline view, in which change of all priorities can be displayed clause by clause, priority values for different colors can be annotated, for example, red can be priority 1, orange can be priority 2 and green can be priority 4, etc. Multiple reviewers working in collaboration can select specific clauses in the contract document to review, the multiple reviewers working in collaboration can select changes of a specific priority in the document to review, or the multiple reviewers working in collaboration can select changes of a specific priority in a specific clause to review, then decide whether to accept or reject the changes.

Figure 6:
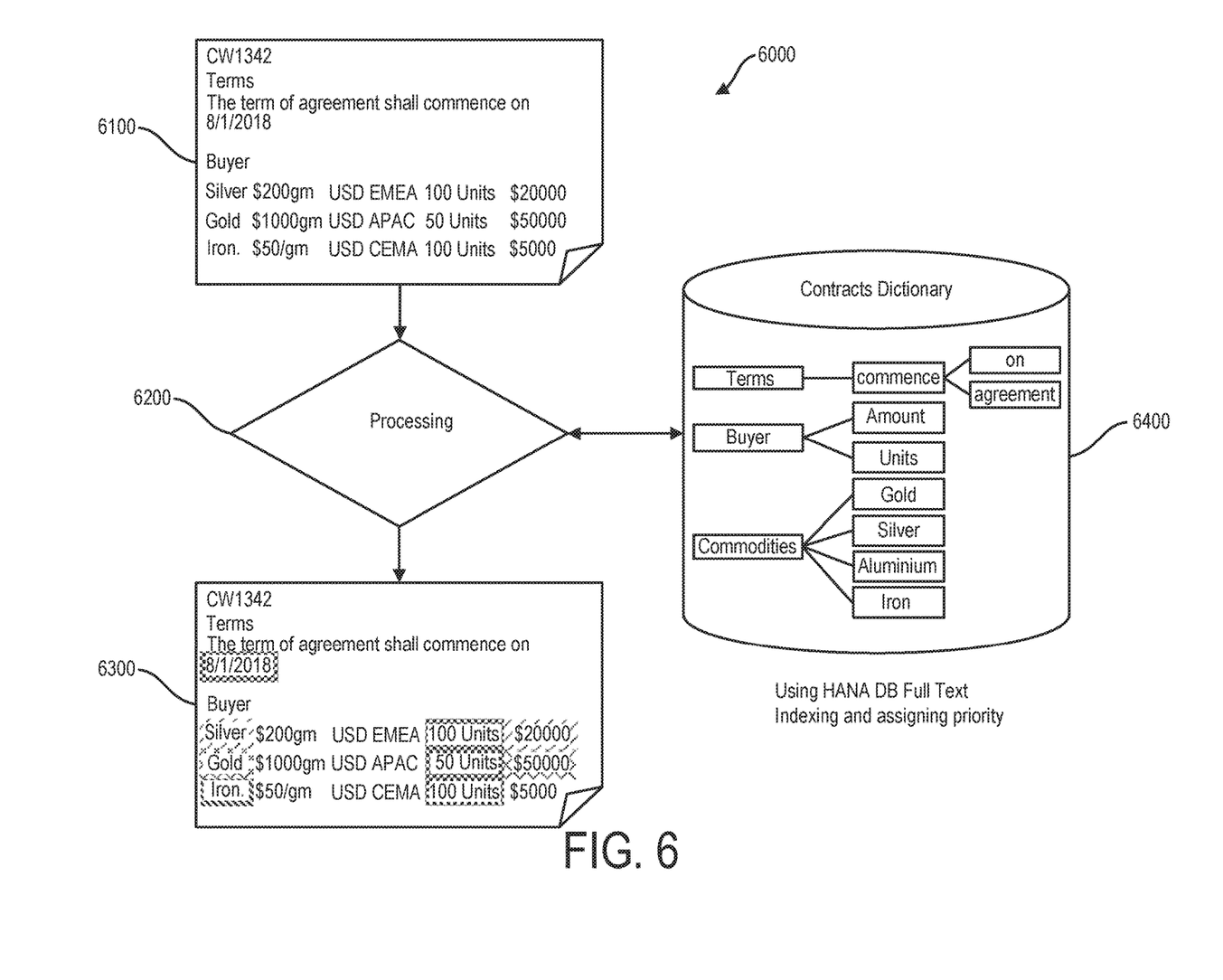
FIG. 6 is a system diagram illustrating a priority based color-coded document comparison system.

FIG. 6 is a system diagram of the priority based color-coded document comparison system. The priority based color-coded document comparison system 6000 can include a contract dictionary engine 6400 which, as discussed above, builds and maintains contract dictionaries for contract documents. The contract dictionary engine 6400 can access a document and extract string tokens from the documents. If a string token extracted from the document already has an assigned ranking priority in the dictionary because the string appears frequently in the contract document, then the string token can be assigned the same ranking priority. Otherwise, if the extracted string does not have an assigned ranking priority in the dictionary, then the system can provide the reviewer with an option to provide a ranking priority value to the extracted string and save the string with its corresponding ranking priority to the dictionary.

When the processing unit 6100 access an old version of a contract document, 6100 can build a contract dictionary for the contract document. The reviewer can re-define the ranking priorities of part or all of the strings in the dictionary, if necessary. When a new version of a contract document 6100 is accessed by a processing unit 6200, the processing unit 6200 can compare the new version with the old version, then lexically analyze the new contract document 6100 and extract string tokens from the changed portion of the new version of the contract document 6100. The processing unit 6200 can then search the contract dictionary to obtain the corresponding ranking priority for each of the changed string tokens. On a graphical user interface 6300, the changed string tokens can be highlighted with visual distinctions, such as colors, corresponding to the ranking priorities of the string tokens.

As discussed above, the reviewer can have an opportunity to provide input and control the appearance and results of the compared document. For example, the reviewer can selected changes of a particular ranking priority to review and to accept/reject the changes of that particular ranking priority.

Figure 7:
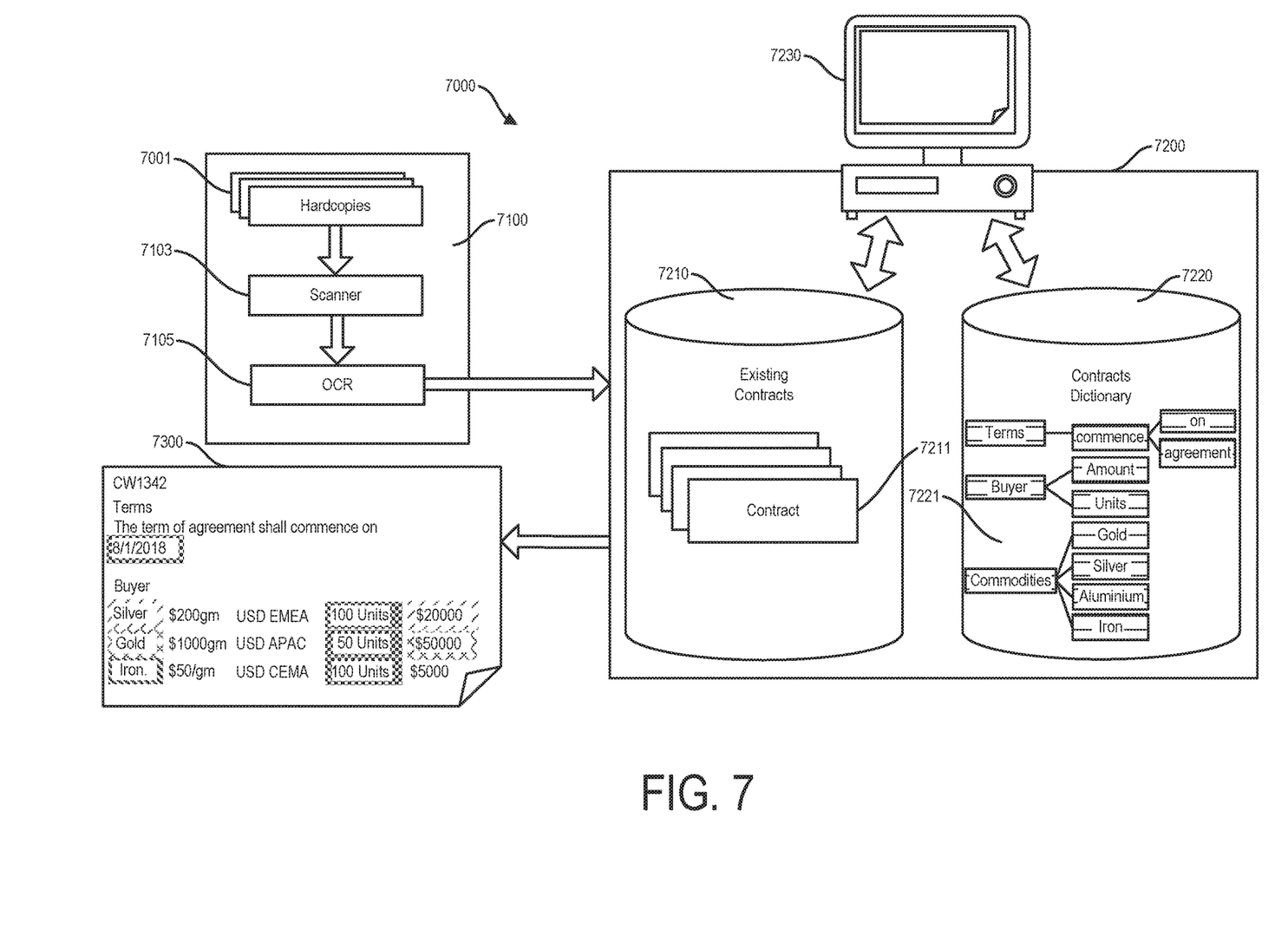
FIG. 7 is a system diagram illustrating the priority based color-coded document comparison system.

FIG. 7 is another system diagram of the priority based color-coded document comparison system. System 7000 can be a priority based color-coded document comparison system. Similar to the system 6000, a contract dictionary 7221 can be stored and maintained in a contract dictionary engine 7220. A database 7210 can store existing contracts and old versions of existing contracts 7211. Both the database 7210 and the contract dictionary engine 7220 can be controlled by a processing and control unit 7230. The system 7000 can include a different module 7100 to access a new document, or a new version of the document. The module 7100 can include a scanner and an optical character recognition (OCR) unit to convert hardcopies of a document into digital formats. The digitized document can be processed and compared in the same way as in system 6000, like in system 6000, the system 7000 can also include an graphical user interface 7300 for displaying the priority based color-coded comparison of the document. The graphical user interface

7300 can also provide the reviewer an opportunity to give input and control the system 7000, as discussed above in FIG. 6.

Figure 8:
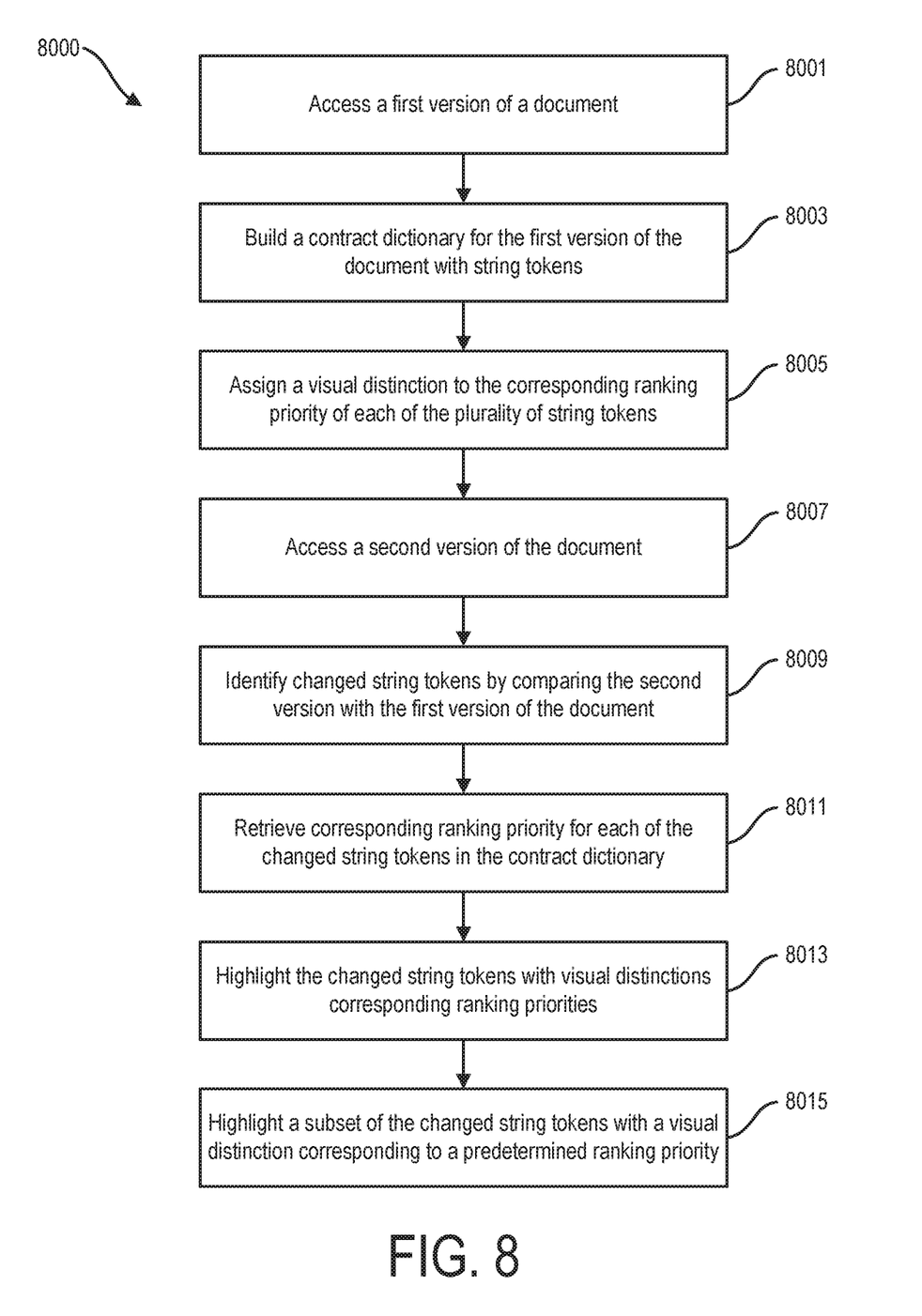
FIG. 8 is flow chart illustrating a priority based color-coded document comparison.

FIG. 8 illustrates a method 8000 for priority based color-coded document comparison. At 8001, a first version of a document can be accessed. The first version of the document can be accessed in different ways including, for example, the first version of the document can be accessed via OCR or networked storage. Thereafter, at 8003, a contract dictionary can be built for the first version of the document with string tokens. If the string tokens contained in the first version of the document is a pre-determined string token, then a ranking priority associated with the pre-determined string token can be assigned to the one of the plurality of string tokens. If the string tokens contained in the first version of the document is not a pre-determined string token, then an option can be provided to add the one of the plurality of string tokens to the contract dictionary and a corresponding ranking priority can be assigned to the one of the plurality of string tokens.

At 8005, a visual distinction can be assigned to the corresponding ranking priority of each of the plurality of string tokens. At 8007, a second version of the document can be accessed. The second version of the document can be accessed in the same way as the first version, for example through OCR, local or networked storage. At 8009, changed string tokens can be identified by comparing the second version with the first version of the document. At 8011, a corresponding ranking priority can be retrieved for each of the changed string tokens in the contract dictionary. At 8013, the changed string tokens can be highlighted with visual distinctions corresponding ranking priorities in a graphical user interface. Instead of displaying changes of all ranking priorities, at 8015, a subset can be displayed. At 8015, a subset of the changed string tokens can be highlighted with a visual distinction corresponding to a predetermined ranking priority.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:
- accessing a first version of a document;
- building a contract dictionary for the document based on the first version of the document, the contract dictionary associating respective string tokens identified in the first version of the document with a corresponding ranking priority value selected from a group of available ranking priority values, wherein:
  - a subset of the string tokens identified in the first version of the document have pre-determined corresponding ranking priority values, and
  - at least one of the string tokens identified in the first version of the document has a corresponding ranking priority value that is not pre-determined and is instead assigned through user selection, provided via a graphical user interface, of one of the available ranking priority values in the group;
- assigning a visual distinction to the respective ranking priority values in the group of available ranking priority values;
- accessing a second version of the document;
- identifying changed string tokens by comparing the second version of the document with the first version of the document;
- retrieving, from the contract dictionary, the corresponding ranking priority for the respective changed string tokens;
- for the respective changed string tokens, highlighting, in the graphical user interface, the changed string token with the visual distinction corresponding to the retrieved ranking priority value for the changed string token; and
- displaying the respective highlighted changed string tokens together with the second version of the document in the graphical user interface.

2. The method of claim 1, wherein the changed string tokens that are highlighted in the graphical user interface are a subset of the changed string tokens that have a particular ranking priority value of interest.

3. The method of claim 2, further comprising:
- accepting changes corresponding to the highlighted subset of the changed string tokens.

4. The method of claim 2, further comprising:
- rejecting changes corresponding to the highlighted subset of the changed string tokens.

5. The method of claim 2, wherein the particular ranking priority value of interest is a highest priority of the group of available ranking priority values.

6. The method of 2, wherein the particular ranking priority of interest is a lowest priority of the group of available ranking priority values.

7. The method of claim 1, wherein accessing the first version of the document is done by feeding a hard copy of the first version of the document to an Optical Character Recognition (OCR) unit.

8. The method of claim 1, wherein accessing the second version of the document is done by feeding a hard copy of the second version of the document to an Optical Character Recognition (OCR) unit.

9. The method of claim 1, wherein accessing the first version of the document is done by obtaining the first version of the document from a local storage or a network.

10. The method of claim 1, wherein accessing the second version of the document is done by obtaining the second version of the document from a local storage or a network.

11. The method of claim 1, wherein building the contract dictionary comprises automatically assigning a low ranking priority value to a string token identified in the first version of the document that is determined to be a linking or auxiliary verb.

12. The method of claim 2, further comprising:
- providing, in the graphical user interface, a first graphical user interface element to accept the highlighted subset of the changed string tokens and a second graphical user interface element to reject the highlighted subset of the changed string tokens.

13. A system comprising:
- at least one data processor; and
- memory storing instructions which, when executed by the at least one data processors, result in operations comprising:
  - accessing a first version of a document;
  - building a contract dictionary for the document based on the first version of the document, the contract dictionary associating respective string tokens identified in the first version of the document with a corresponding ranking priority value selected from a group of available ranking priority values, wherein:
    - a subset of the string tokens identified in the first version of the document have pre-determined corresponding ranking priority values, and
    - at least one of the string tokens identified in the first version of the document has a corresponding ranking priority value that is not pre-determined and is instead assigned through user selection, provided via a graphical user interface, of one of the available ranking priority values in the group;
  - assigning a visual distinction to the respective ranking priority values in the group of available ranking priority values;
  - accessing a second version of the document;
  - identifying changed string tokens by comparing the second version of the document with the first version of the document;
  - retrieving, from the contract dictionary, the corresponding ranking priority for the respective changed string tokens;
  - for the respective changed string tokens, highlighting, in the graphical user interface, the changed string token with the visual distinction corresponding to the retrieved ranking priority value for the changed string token; and
  - displaying the respective highlighted changed string tokens together with the second version of the document in the graphical user interface.

14. The system of claim 13, wherein the changed string tokens that are highlighted in the graphical user interface are a subset of the changed string tokens that have a particular ranking priority value of interest.

15. The system of claim 14, wherein the operations further comprise:
- accepting changes corresponding to the highlighted subset of the changed string tokens.

16. The system of claim 14, wherein the operations further comprise:
- rejecting changes corresponding to the highlighted subset of the changed string tokens.

17. The system of claim 14, wherein the particular ranking priority value of interest is a highest priority of the group of available ranking priority values.

18. The system of claim 17, wherein the operations further comprise:
accepting or rejecting the highlighted subset of the changed string tokens.

19. A non-transitory computer program product storing instructions which, when executed by at least one data processor forming part of at least one computing device, result in operations comprising:
accessing a first version of a document;
building a contract dictionary for the document based on the first version of the document, the contract dictionary associating respective string tokens identified in the first version of the document with a corresponding ranking priority value selected from a group of available ranking priority values, wherein:
a subset of the string tokens identified in the first version of the document have pre-determined corresponding ranking priority values, and
at least one of the string tokens identified in the first version of the document has a corresponding ranking priority value that is not pre-determined and is instead assigned through user selection, provided via a graphical user interface, of one of the available ranking priority values in the group;
assigning a visual distinction to the respective ranking priority values in the group of available ranking priority values;
accessing a second version of the document;
identifying changed string tokens by comparing the second version of the document with the first version of the document;
retrieving, from the contract dictionary, the corresponding ranking priority for the respective changed string tokens;
receiving user-generated input via the graphical interface selecting one of the ranking priority values in the group;
highlighting only respective changed string tokens that have the selected ranking priority value, wherein the highlighting applies the visual distinction corresponding to such the selected ranking priority value in the graphical user interface; and
displaying the respective highlighted changed string tokens together with the second version of the document in the graphical user interface.

* * * * *